(12) United States Patent  
Nammoto et al.

(10) Patent No.: US 10,589,424 B2  
(45) Date of Patent: Mar. 17, 2020

(54) ROBOT CONTROL DEVICE, ROBOT, AND ROBOT SYSTEM

(71) Applicant: Seiko Epson Corporation, Tokyo (JP)

(72) Inventors: Takashi Nammoto, Azumino (JP); Kazuhiro Kosuge, Sendai (JP); Kengo Yamaguchi, Sendai (JP)

(73) Assignee: Seiko Epson Corporation (JP)

( * ) Notice: Subject to any disclaimer, the term of this patent is extended or adjusted under 35 U.S.C. 154(b) by 225 days.

(21) Appl. No.: 15/716,927

(22) Filed: Sep. 27, 2017

(65) Prior Publication Data

US 2018/0085923 A1    Mar. 29, 2018

(30) Foreign Application Priority Data

Sep. 29, 2016 (JP) .................. 2016-191980

(51) Int. Cl.
```
G06F 19/00      (2018.01)
B25J 9/16       (2006.01)
B25J 9/00       (2006.01)
```
(52) U.S. Cl.
CPC .......... *B25J 9/1669* (2013.01); *B25J 9/0087* (2013.01); *B25J 9/1612* (2013.01); *B25J 9/1633* (2013.01); *B25J 9/1628* (2013.01); *G05B 2219/39344* (2013.01)

(58) Field of Classification Search
None
See application file for complete search history.

(56) References Cited

U.S. PATENT DOCUMENTS 9,014,857 B2   4/2015   Ota et al.
9,044,856 B2   6/2015   Nagasaka et al.

FOREIGN PATENT DOCUMENTS

JP   2013-111726 A   6/2013
JP   2013-144355 A   7/2013

*Primary Examiner* — Bhavesh V Amin
(74) *Attorney, Agent, or Firm* — Harness, Dickey & Pierce, P.L.C.

(57) ABSTRACT

A robot control device calculates an evaluation value, based on a partial point cloud included in a plurality of areas corresponding to a gripping unit of a robot for gripping a target object, of a three-dimensional point cloud representing a three-dimensional shape of a surface of the target object. The robot control device calculates a position and an attitude of the gripping unit taken when the gripping unit is made to grip the target object, based on the calculated evaluation value. The robot control device causes the gripping unit to grip the target object, based on the position and the attitude of the gripping unit thus calculated.

6 Claims, 8 Drawing Sheets

ROBOT CONTROL DEVICE, ROBOT, AND ROBOT SYSTEM

BACKGROUND

1. Technical Field

The present invention relates to a robot control device, a robot, and a robot system.

2. Related Art

Research and development of techniques for making a robot carry out work including a movement of gripping an object are underway.

In connection with this, a robot device is known in which a gripping easiness indicator that quantitatively evaluates the easiness of a gripping attitude for gripping a target object or a transition attitude to the gripping attitude is calculated for each of a plurality of arms provided in the robot device and in which an arm to be used to actually grip the target object is selected, based on the gripping easiness indicator calculated for each arm (see, for example, JP-A-2013-111726).

However, such a robot device does not take into account the error (uncertainty) in three-dimensional position measurement of a target object using a three-dimensional measuring machine and therefore may not be able to carry out stable gripping of a target object.

SUMMARY

An aspect of the invention is directed to a robot control device that calculates an evaluation value, based on a partial point cloud included in one or more areas corresponding to a gripping unit of a robot for gripping a target object, of a three-dimensional point group representing a three-dimensional shape of a surface of the target object. The robot control device calculates a position and an attitude of the gripping unit taken when the gripping unit is made to grip the target object, based on the calculated evaluation value. The robot control device causes the gripping unit to grip the target object, based on the position and the attitude of the gripping unit thus calculated.

With this configuration, the robot control device calculates an evaluation value, based on a partial point cloud included in one or more areas corresponding to a gripping unit of a robot for gripping a target object, of a three-dimensional point cloud representing a three-dimensional shape of a surface of the target object. The robot control device calculates a position and an attitude of the gripping unit taken when the gripping unit is made to grip the target object, based on the calculated evaluation value. The robot control device causes the gripping unit to grip the target object, based on the position and the attitude of the gripping unit thus calculated. Thus, the robot control device can cause the robot to grip the target object stably.

In another aspect of the invention, in the robot control device, the area may be an area based on each of one or more virtual points corresponding to the gripping unit.

With this configuration, in the robot control device, the one or more areas corresponding to the gripping unit of the robot for gripping the target object, of the three-dimensional point cloud representing the three-dimensional shape of the surface of the target object, are areas based on each of one or more virtual points corresponding to the gripping unit. Thus, the robot control device can cause the robot to grip the target object stably, based on the area based on each of the one or more virtual points corresponding to the gripping unit.

In another aspect of the invention, the robot control device may calculate the evaluation value, based on at least one of a density of the partial point cloud and a value expressing distribution of points forming the partial point cloud, and may calculate the position and the attitude of the gripping unit taken when the gripping unit is made to grip the target object, based on the calculated evaluation value.

With this configuration, the robot control device calculates the evaluation value, based on at least one of a density of the partial point cloud and a value expressing distribution of points forming the partial point cloud, and calculates the position and the attitude of the gripping unit taken when the gripping unit is made to grip the target object, based on the calculated evaluation value. Thus, the robot control device can cause the robot to grip the target object stably, based on the evaluation value calculated on the basis of at least one of the density of the partial point cloud and the value expressing the distribution of the points forming the partial point cloud.

In another aspect of the invention, the robot control device may calculate each of a first evaluation value expressing stability of gripping the target object by the gripping unit, the density, and the value, based on the partial point cloud. The robot control device may calculate, as the evaluation value, a second evaluation value by multiplying the calculated first evaluation value by a weight based on the density and the value. The robot control device may calculate the position and the attitude of the gripping unit taken when the gripping unit is made to grip the target object, based on the calculated evaluation value.

With this configuration, the robot control device calculates each of a first evaluation value expressing stability of gripping the target object by the gripping unit, the density of the partial point cloud, and the value expressing the distribution of the points forming the partial point cloud, based on the partial point cloud. The robot control device calculates, as the evaluation value, a second evaluation value by multiplying the calculated first evaluation value by a weight based on the density and the value. The robot control device calculates the position and the attitude of the gripping unit taken when the gripping unit is made to grip the target object, based on the calculated evaluation value. Thus, the robot control device can cause the robot to grip the target object stably, based on the second evaluation value calculated by multiplying the first evaluation value by the weight based on the density of the partial point cloud and the value expressing the distribution of the points forming the partial point cloud.

Another aspect of the invention is directed to a robot that is controlled by the robot control device described above.

With this configuration, for the robot, an evaluation value is calculated, based on a partial point cloud included in one or more areas corresponding to a gripping unit of a robot for gripping a target object, of a three-dimensional point cloud representing a three-dimensional shape of a surface of the target object, and a position and an attitude of the gripping unit taken when the gripping unit is made to grip the target object is calculated, based on the calculated evaluation value. The robot grips the target object by the gripping unit, based on the position and the attitude of the gripping unit thus calculated. Thus, the robot can grip the target object stably.

Another aspect of the invention is directed to a robot system including the robot control device described above and the robot controlled by the robot control device.

With this configuration, the robot system calculates an evaluation value, based on a partial point cloud included in one or more areas corresponding to a gripping unit of a robot for gripping a target object, of a three-dimensional point cloud representing a three-dimensional shape of a surface of the target object. The robot system calculates a position and an attitude of the gripping unit taken when the gripping unit is made to grip the target object, based on the calculated evaluation value. The robot system causes the gripping unit to grip the target object, based on the position and the attitude of the gripping unit thus calculated. Thus, the robot system can cause the robot to grip the target object stably.

With the foregoing configuration, the robot control device and the robot system calculate an evaluation value, based on a partial point cloud included in one or more areas corresponding to a gripping unit of a robot for gripping a target object, of a three-dimensional point cloud representing a three-dimensional shape of a surface of the target object. The robot control device and the robot system calculate a position and an attitude of the gripping unit taken when the gripping unit is made to grip the target object, based on the calculated evaluation value. The robot control device and the robot system cause the gripping unit to grip the target object, based on the position and the attitude of the gripping unit thus calculated. Thus, the robot control device and the robot system can cause the robot to grip the target object stably.

Meanwhile, for the robot, an evaluation value is calculated, based on a partial point cloud included in one or more areas corresponding to a gripping unit of a robot for gripping a target object, of a three-dimensional point cloud representing a three-dimensional shape of a surface of the target object, and a position and an attitude of the gripping unit taken when the gripping unit is made to grip the target object is calculated, based on the calculated evaluation value. The robot grips the target object by the gripping unit, based on the position and the attitude of the gripping unit thus calculated. Thus, the robot can grip the target object stably.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Hereinafter, an embodiment of the invention will be described with reference to the drawings.
Configuration of Robot System First, the configuration of a robot system 1 will be described.

Figure 1:
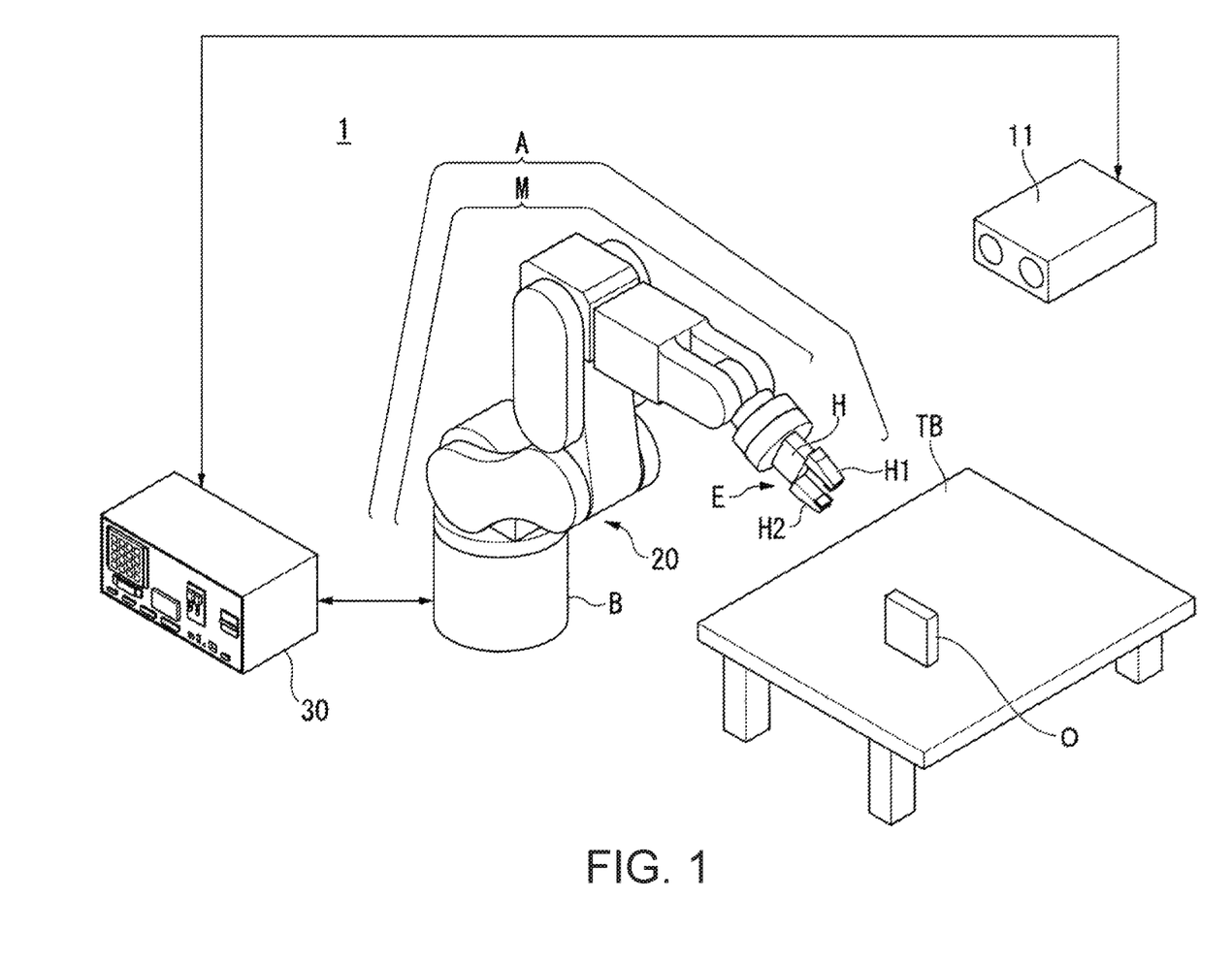
FIG. 1 shows an example of the configuration of a robot system 1 according to an embodiment.

FIG. 1 shows an example of the configuration of the robot system 1 according to the embodiment. The robot system 1 includes one or more image pickup units, a robot 20, and a robot control device 30. In the description below, as an example, the case where the robot system 1 has four image pickup units 11 to 14 will be described. However, in FIG. 1, in order to simplify the illustration, only the image pickup unit 11 is shown and the image pickup units 12 to 14 are omitted.

Each of the image pickup units 11 to 14 is, for example, a stereo camera having a CCD (charge coupled device) or CMOS (complementary metal oxide semiconductor) or the like which converts condensed light into an electrical signal. In this example, each of the image pickup units 11 to 14 is installed at such a position as to be able to pick up a stereo image of a target object O placed on a top surface of a workbench TB shown in FIG. 1, from different directions from each other. The direction in which each of the image pickup units 11 to 14 picks up a stereo image of the target object O may be any direction, provided that each of the image pickup units 11 to 14 can pick up a stereo image of a part or the entirety of a surface of the target object O that is visible from outside. This surface refers to the surface of the target object O except a bottom surface of the target object O that is in contact with the workbench TB. In the description below, as an example, the case where the direction in which each of the image pickup units 11 to 14 picks up a stereo image of the target object O is a direction in which each of the image pickup units 11 to 14 picks up a stereo image of the entirety of the surface of the target object O that is visible from outside will be described. In this case, the stereo image picked up by each of the image pickup units 11 to 14 thoroughly covers the surface visible from outside, of the target object O placed on the top surface of the workbench TB. In other words, a part of the surface visible from outside, of the target object O placed on the top surface of the workbench TB, is included in one of the stereo images picked up by the image pickup units 11 to 14, no matter what the part is.

Each of the image pickup units 11 to 14 is connected to the robot control device 30 via a cable in a way that enables communication. The wired communication via the cable is carried out, for example, according to a standard such as Ethernet (trademark registered) or USB (universal serial bus). Apart or all of the image pickup units 11 to 14 may be configured to be connected to the robot control device 30 via wireless communication carried out according to a communication standard such as Wi-Fi (trademark registered).

The robot 20 is a single-arm robot having an arm A and a support pedestal B supporting the arm A. The single-arm robot is a robot with one arm like the arm A in this example. The robot 20 may also be a multi-arm robot instead of a single-arm robot. The multi-arm robot is a robot with two or more arms (for example, two or more arms A). Of multi-arm robots, a robot with two arms is also referred to as a dual-arm robot. That is, the robot 20 may be a dual-arm robot with two arms or a multi-arm robot with three or more arms (for example, three or more arms A). The robot 20 may also be other types of robots such as SCARA robot, orthogonal coordinate robot, and cylindrical robot. The orthogonal coordinate robot may be, for example, a gantry robot.

The arm A has an end effector E and a manipulator M.

In this example, the end effector E is an end effector having a gripping unit H including a finger H1 and a finger H2 capable of gripping an object. The finger H1 and the finger H2 are provided on the surface opposite to the surface on the side of the manipulator M, of the surfaces of the gripping unit H. The finger H1 and the finger H2 are provided in such a way as to be movable in directions toward and away from each other along this surface. Thus, the gripping unit H can grip (that is, pinch) an object by changing the distance between the finger H1 and the finger H2. In this example, a gripping unit coordinate system which is a three-dimensional coordinate system moving with the gripping unit H corresponds to a predetermined position on the gripping unit H. Therefore, the position of the gripping unit H is expressed by the position of the origin of the gripping unit coordinate system on a robot coordinate system RC. The attitude of the gripping unit H is expressed by the direction of each coordinate axis of the gripping unit coordinate system on the robot coordinate system RC. The predetermined position on the gripping unit H is, for example, the position of the center of gravity of the gripping unit H. Instead of this, the predetermined position on the gripping unit H may be another position corresponding to the gripping unit H. The end effector E may also be an end effector capable of lifting an object by air suction, magnetic force, jig or the like, or another type of end effector, instead of the end effector having the gripping unit H.

The end effector E is connected to the robot control device 30 via a cable in a way that enables communication. Thus, the end effector E carries out an operation based on a control signal acquired from the robot control device 30. The wired communication via the cable is carried out, for example, according to a standard such as Ethernet (trademark registered) or USB. Also, the end effector E may be configured to be connected to the robot control device 30 via wireless communication carried out according to a communication standard such as Wi-Fi (trademark registered).

The manipulator M has six joints. Each of the six joints has an actuator, not illustrated. That is, the arm A having the manipulator M is a 6-axis vertical multi-joint arm. The arm A operates with a degree of freedom based on the six axes, linked with the support pedestal B, the end effector E, the manipulator M and the actuator of each of the six joints of the manipulator M. The arm A may also be configured to operate with a degree of freedom based on five or fewer axes or may be configured to operate with a degree of freedom based on seven or more axes.

Each of the six actuators (provided on the joints) of the manipulator M is connected to the robot control device 30 via a cable in away that enables communication. Thus, each of the actuator causes the manipulator M to operate, based on a control signal acquired from the robot control device 30. The wired communication via the cable is carried out, for example, according to a standard such as Ethernet (trademark registered) or USB. Apart or all of the six actuators of the manipulator M may be configured to be connected to the robot control device 30 via wireless communication carried out according to a communication standard such as Wi-Fi (trademark registered).

In this example, the robot control device 30 is a controller which controls the robot 20 (causes the robot 20 to operate). The robot control device 30 causes the robot 20 to operate and causes the robot 20 to carry out predetermined work.

In the case where the robot system 1 has only one image pickup unit, the image pickup unit has a moving mechanism which enables the image pickup unit to pick up an image of the target object O placed on the top surface of the workbench TB from a plurality of directions. In this case, the robot control device 30 controls the moving mechanism to move the image pickup unit and causes the image pickup unit to pick up a stereo image of the target object O from a plurality of directions.

Outline of Predetermined Work Carried Out by Robot

Hereinafter, an outline of the predetermined work carried out by the robot 20 will be described.

In this example, the workbench TB is arranged in a work area where the robot 20 can perform work. The target object O is placed on the top surface of the workbench TB. The workbench TB is, for example, a platform such as a table. Instead of a table, the workbench TB may be another object where the target object O can be placed, such as a floor surface or shelf. The target object O is, for example, an industrial component or member such as a plate, screw, or bolt to be assembled onto a product. In FIG. 1, in order to simplify the illustration, the target object O is shown as a rectangular-parallelepiped object having a large enough size to be gripped by the end effector E. Instead of an industrial part or member, the target object O may be another object such as an everyday-use product or living body. Instead of the rectangular-parallelepiped shape, the shape of the object O may be another shape.

The robot 20 carries out the work of moving the arm A to grip the target object O and placing the gripped target object O in a material feeding area, not illustrated, as the predetermined work. Instead of this, the predetermined work may be any work including the operation of gripping the target object O.

Outline of Processing in Which Robot Control Device Causes Robot to Carry Out Predetermined Work Hereinafter, an outline of the processing in which the robot control device 30 causes the robot 20 to carry out the predetermined work will be described.

The robot control device 30 causes each of the image pickup units 11 to 14 to pick up a stereo image of the target object O. The robot control device 30 acquires from the image pickup unit 11 a stereo image picked up by the image pickup unit 11 as a first picked-up image. The robot control device 30 also acquires from the image pickup unit 12 a stereo image picked up by the image pickup unit 12 as a second picked-up image. The robot control device 30 also acquires from the image pickup unit 13 a stereo image picked up by the image pickup unit 13 as a third picked-up image. The robot control device 30 also acquires from the image pickup unit 14 a stereo image picked up by the image pickup unit 14 as a fourth picked-up image.

Based on the first to fourth picked-up images thus acquired, the robot control device 30 generates a three-dimensional point cloud representing a three-dimensional shape of the target object O included in each of the first to fourth picked-up images. More specifically, based on the first to fourth picked-up images, the robot control device 30 detects the three-dimensional position (three-dimensional coordinates) of each point on a surface of the target object O that is visible from outside, included in each of the first to fourth picked-up images. Based on the detected three-dimensional position, the robot control device 30 generates each three-dimensional point cloud, which is a point cloud representing a three-dimensional shape of the surface. That is, each point forming each three-dimensional point cloud indicates a three-dimensional position. The three-dimensional position may be a three-dimensional position on a world coordinate system, a three-dimensional position on the robot coordinate system RC, or a three-dimensional position on other three-dimensional coordinate systems. In the description below, as an example, the case where the robot control device 30 detects, based on each of the first to fourth picked-up images, the three-dimensional position on the robot coordinate system RC of each point on the surface of the target object O visible from outside included in each of the first to fourth picked-up images will be described. As a method for the robot control device 30 to generate a three-dimensional point cloud from each of the first to fourth picked-up images, a known method or a method yet to be developed may be used.

The robot control device 30 generates a whole-circumference point cloud which is a three-dimensional point cloud representing the shape of an entire surface visible from outside, of the target object O placed on the top surface of the workbench TB, based on the generated four three-dimensional point clouds. As a method for generating a three-dimensional point cloud representing the shape of the entire surface based on four three-dimensional point clouds representing the shapes of parts of the surface that are different from each other, a known method or a method yet to be developed may be used.

Here, another robot control device (for example, related-art robot control device) that is different from the robot control device 30, for example, calculates the position and the attitude of the gripping unit H taken when the gripping unit H is made to grip the target object O, according to the shape of the target object O represented by the generated whole-circumference point cloud, and causes the position and the attitude thus calculated to coincide with the position and the attitude of the gripping unit H, and can then causes the gripping unit H to grip the target object O. However, the whole-circumference point cloud may, in some cases, not accurately represent the three-dimensional shape of the surface of the target object O visible from outside, because of an error caused by the image pickup state of the target object O included in each of the first to fourth picked-up images picked up stereoscopically by each of the image pickup units 11 to 14 due to the image pickup condition of the target object O and the material of the target object Oar the like, and because of an error at the time of generating the whole-circumference point cloud based on four three-dimensional point clouds. In such cases, this robot control device may not be able to cause the robot 20 to carry out stable gripping of the target object O. If the gripping of the target object O is unstable, the relative positional relation between the gripping unit H and the target object O gripped by the gripping unit H may change due to vibrations or the like caused by the operation of the robot 20, for example, by the time when the robot 20 places the target object O in the material feeding area after gripping the target object O by the gripping unit H. Consequently, this robot control device may not be able to cause the robot 20 to carry out the predetermined work accurately.

Thus, in order to cause the robot 20 to grip the target object O stably, the robot control device 30 in this example calculates an evaluation value, based on a partial point cloud included in one or more areas corresponding to the gripping unit H of the robot 20 gripping the target object O, of the generated whole-circumference point cloud. The robot control device 30 calculates the position and the attitude of the gripping unit H taken when the gripping unit H is made to grip the target object O, based on the calculated evaluation value. The robot control device 30 causes the gripping unit H to grip the target object O, based on the position and the attitude of the gripping unit H thus calculated. Thus, the robot control device 30 can cause the robot 20 to grip the target object O stably. Here, the evaluation value of the position and the attitude taken by the gripping unit H when the gripping unit H is made to grip the target object O is a value representing the degree of stability of the gripping of the target object O by the gripping unit H in the case where the position and the attitude of the gripping unit H coincide with this position and this attitude. As the evaluation value becomes higher, it represents the robot 20 can grip the target object O more stably in the case in question.

In the description below, of the processing in which the robot control device 30 causes the robot 20 to carry out the predetermined work, the processing of calculating an evaluation value, based on a partial point cloud included in one or more areas corresponding to the gripping unit H of the robot 20 gripping the target object O, of the whole-circumference point cloud generated by the robot control device 30, and the processing of calculating the position and the attitude of the gripping unit H taken when the gripping unit H is made to grip the target object O, based on the calculated evaluation value, will be described in detail.

Hardware Configuration of Robot Control Device

Figure 2:
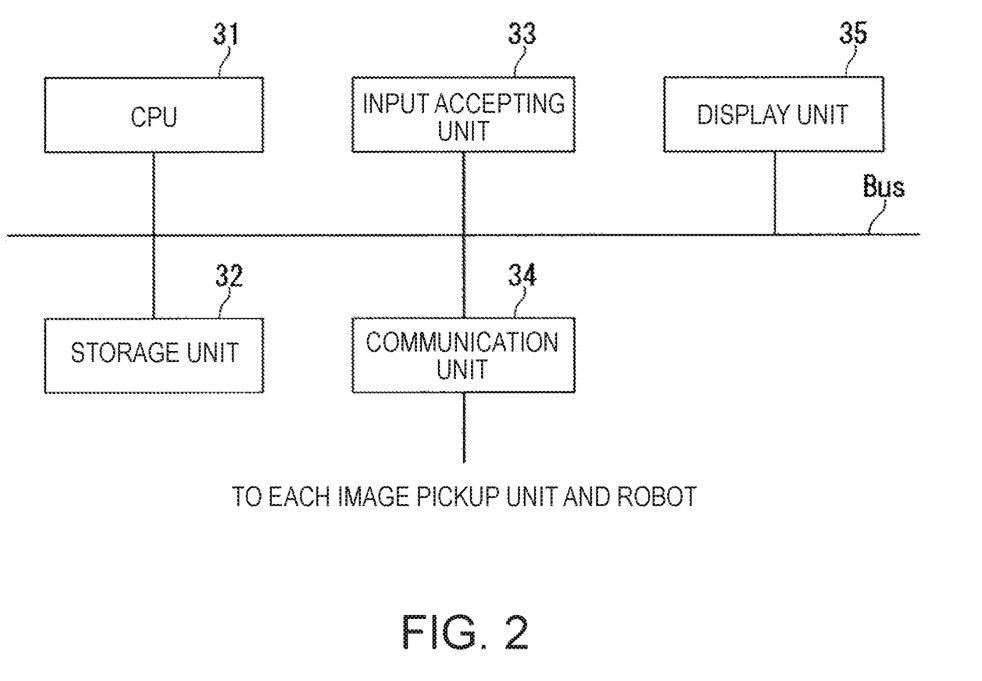
FIG. 2 shows an example of the hardware configuration of a robot control device 30.

Referring to FIG. 2, the hardware configuration of the robot control device 30 will be described below. FIG. 2 shows an example of the hardware configuration of the robot control device 30.

The robot control device 30 has, for example, a CPU (central processing unit) 31, a storage unit 32, an input accepting unit 33, a communication unit 34, and a display unit 35. These components are connected to each other via a bus Bus in a way that enables communication. The robot control device 30 also communicates with each of the image pickup unit 11, the image pickup unit 12, the image pickup unit 13, the image pickup unit 14, and the robot 20 via the communication unit 34.

The CPU 31 executes various programs stored in the storage unit 32.

The storage unit 32 includes, for example, an HDD (hard disk drive), SSD (solid state drive), EEPROM (electrically erasable programmable read-only memory), ROM (read-only memory), RAM (random access memory), or the like. The storage unit 32 may be an external storage device connected via a digital input/output port like a USB port, instead of a storage device built inside the robot control device 30. The storage unit 32 stores various kinds of information, various programs, various image and the like processed by the robot control device 30.

The input accepting unit 33 is, for example, a keyboard, mouse, touch pad or another input device. Also, instead of these, the input accepting unit 33 may be a touch panel integrated with the display unit 35.

The communication unit 34 includes, for example, a digital input/output port such as a USB port, or an Ethernet (trademark registered) port or the like.

The display unit 35 is, for example, a liquid crystal display panel or an organic EL (electroluminescence) display panel.

Functional Configuration of Robot Control Device

Figure 3:
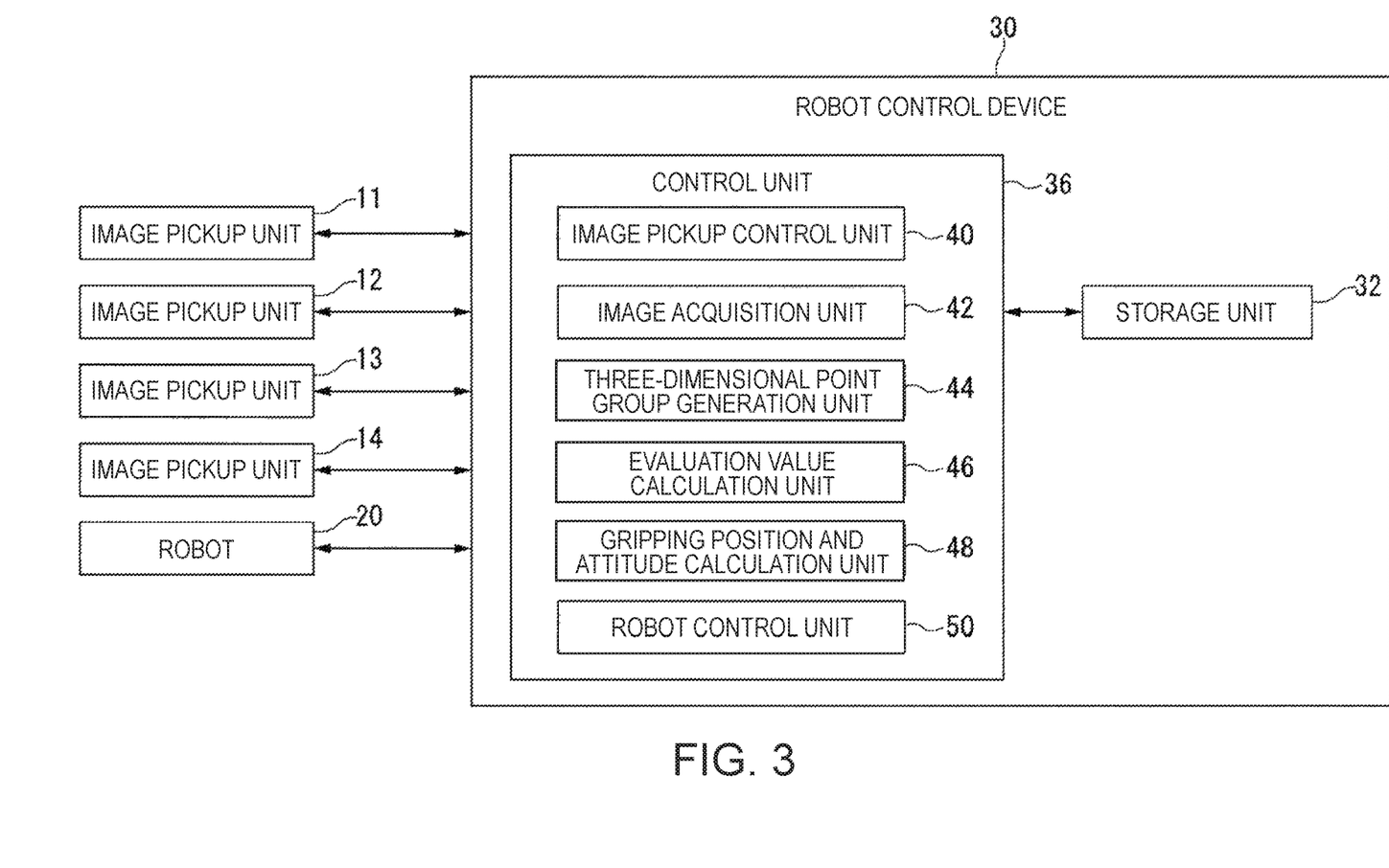
FIG. 3 shows an example of the functional configuration of the robot control device 30.

Referring to FIG. 3, the functional configuration of the robot control device 30 will be described below. FIG. 3 shows an example of the functional configuration of the robot control device 30.

The robot control device 30 has the storage unit 32 and a control unit 36.

The control unit 36 controls the entirety of the robot control device 30. The control unit 36 has an image pickup control unit 40, an image acquisition unit 42, a three-dimensional point cloud generation unit 44, an evaluation value calculation unit 46, a gripping position and attitude calculation unit 48, and a robot control unit 50. These functional units provided in the control unit 36 are realized, for example, by the CPU 31 executing various programs stored in the storage unit 32. Apart or all of the functional units may be a hardware functional unit such as LSI (large scale integrated circuit) or ASIC (application specific integrated circuit).

The image pickup control unit 40 causes the image pickup unit 11 to pick up a stereo image over a range which the image pickup unit 11 can cover. The image pickup control unit 40 also causes the image pickup unit 12 to pickup a stereo image over a range which the image pickup unit 12 can cover. The image pickup control unit 40 also causes the image pickup unit 13 to pick up a stereo image over a range which the image pickup unit 13 can cover. The image pickup control unit 40 also causes the image pickup unit 14 to pick up a stereo image over a range which the image pickup unit 14 can cover.

The image acquisition unit 42 acquires the stereo image picked up by the image pickup unit 11 from the image pickup unit 11 as a first picked-up image. The image acquisition unit 42 also acquires the stereo image picked up by the image pickup unit 12 from the image pickup unit 12 as a second picked-up image. The image acquisition unit 42 also acquires the stereo image picked up by the image pickup unit 13 from the image pickup unit 13 as a third picked-up image. The image acquisition unit 42 also acquires the stereo image picked up by the image pickup unit 14 from the image pickup unit 14 as a fourth picked-up image.

The three-dimensional point cloud generation unit 44 generates a three-dimensional point cloud of the target object O included in the first picked-up image, based on the first picked-up image acquired by the image acquisition unit 42. The three-dimensional point cloud generation unit 44 also generates a three-dimensional point cloud of the target object O included in the second picked-up image, based on the second picked-up image acquired by the image acquisition unit 42. The three-dimensional point cloud generation unit 44 also generates a three-dimensional point cloud of the target object O included in the third picked-up image, based on the third picked-up image acquired by the image acquisition unit 42. The three-dimensional point cloud generation unit 44 also generates a three-dimensional point cloud of the target object O included in the fourth picked-up image, based on the fourth picked-up image acquired by the image acquisition unit 42. The three-dimensional point cloud generation unit 44 generates the foregoing whole-circumference point cloud, based on the four three-dimensional point clouds generated based on the first to fourth picked-up images, respectively.

The evaluation value calculation unit 46 calculation an evaluation value based on the whole-circumference point cloud generated by the three-dimensional point cloud generation unit 44.

The gripping position and attitude calculation unit 48 calculates a gripping position and attitude which is the position and the attitude of the gripping unit H taken when the gripping unit H is made to grip the target object O, based on the evaluation value calculated by the evaluation value calculation unit 46.

The robot control unit 50 causes the robot 20 to move, based on the gripping position and attitude calculated by the gripping position and attitude calculation unit 48, and thus causes the robot 20 to carryout predetermined work.

Figure 4:
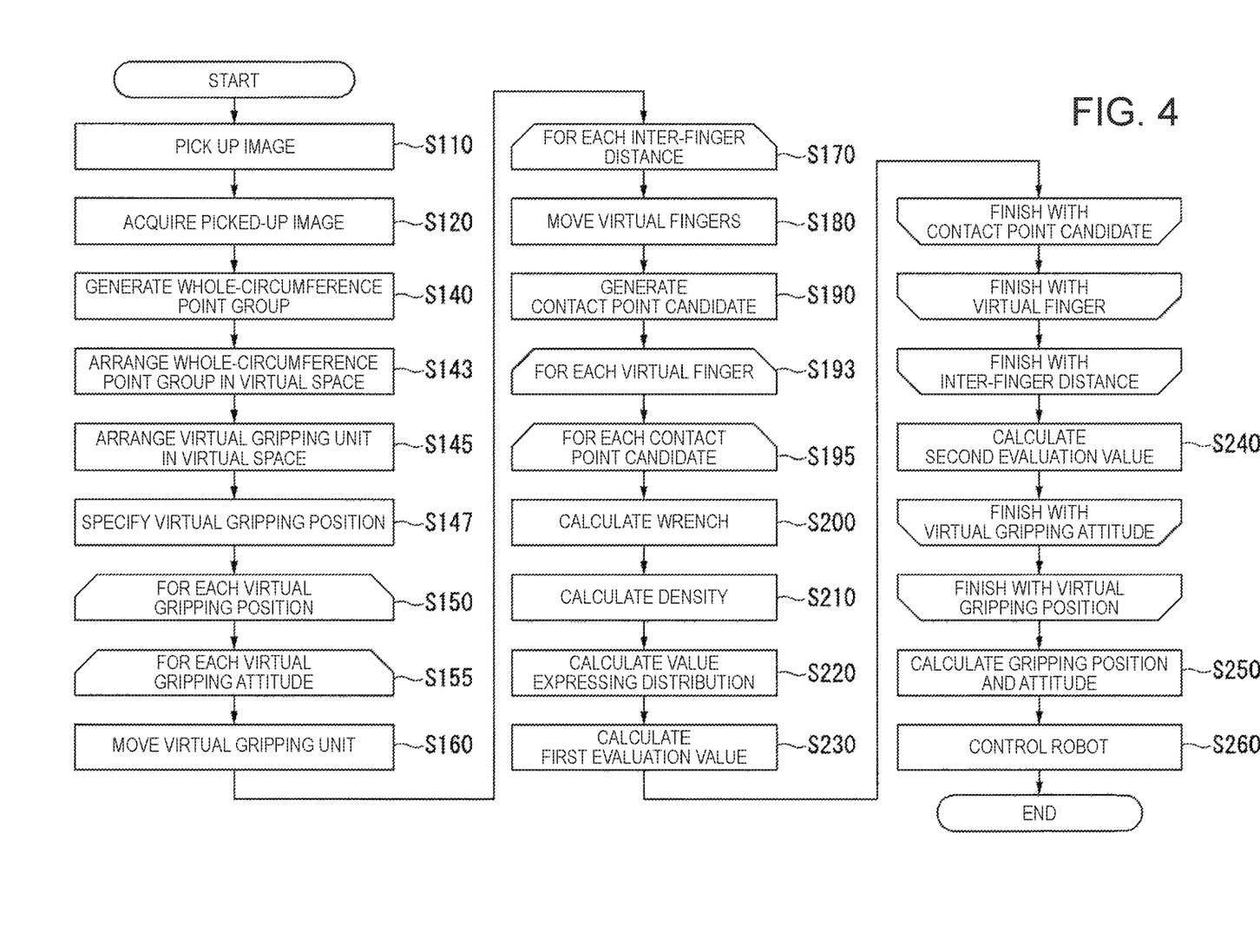
FIG. 4 is a flowchart showing an example of the flow of processing in which the robot control device 30 causes a robot 20 to carry out predetermined work.

Processing in Which Robot Control Device Causes Robot to Carry Out Predetermined Work Referring to FIG. 4, the processing in which the robot control device 30 causes the robot 20 to carry out predetermined work will be described below. FIG. 4 is a flowchart showing an example of the flow of the processing in which the robot control device 30 causes the robot 20 to carry out predetermined work.

The image pickup control unit 40 causes each of the image pickup units 11 to 14 to pick up a stereo image of the target object O (Step S110). Specifically, the image pickup control unit 40 causes the image pickup unit 11 to pick up a stereo image over a range which the image pickup unit 11 can cover. The image pickup control unit 40 also causes the image pickup unit 12 to pick up a stereo image over a range which the image pickup unit 12 can cover. The image pickup control unit 40 also causes the image pickup unit 13 to pickup a stereo image over a range which the image pickup unit 13 can cover. The image pickup control unit 40 also causes the image pickup unit 14 to pick up a stereo image over a range which the image pickup unit 14 can cover.

Next, the image acquisition unit 42 acquires the stereo images picked up respectively by the image pickup units 11 to 14 in Step S110, from the image pickup units 11 to 14, respectively (Step S120). Specifically, the image acquisition unit 42 acquires the stereo image picked up by the image pickup unit 11 from the image pickup unit 11 as a first picked-up image. The image acquisition unit 42 also acquires the stereo image picked up by the image pickup unit 12 from the image pickup unit 12 as a second picked-up image. The image acquisition unit 42 also acquires the stereo image picked up by the image pickup unit 13 from the image pickup unit 13 as a third picked-up image. The image acquisition unit 42 also acquires the stereo image picked up by the image pickup unit 14 from the image pickup unit 14 as a fourth picked-up image.

Next, the three-dimensional point cloud generation unit 44 generates the foregoing whole-circumference point cloud, based on the first to fourth picked-up images acquired by the image acquisition unit 42 in Step S120 (Step S140). Next, the evaluation value calculation unit 46 arranges the whole-circumference point cloud generated in Step S140, in a virtual space VR generated in advance in a storage area of the storage unit 32 (Step S143). At this point, the evaluation value calculation unit 46 arranges each point forming the whole-circumference point cloud, at a three-dimensional position in the virtual space VR that corresponds to the three-dimensional position of each point on the robot coordinate system RC. Between the three-dimensional position in the virtual space VR and the three-dimensional position on the robot coordinate system RC, a correspondence is established in advance by calibration.

Figure 5:
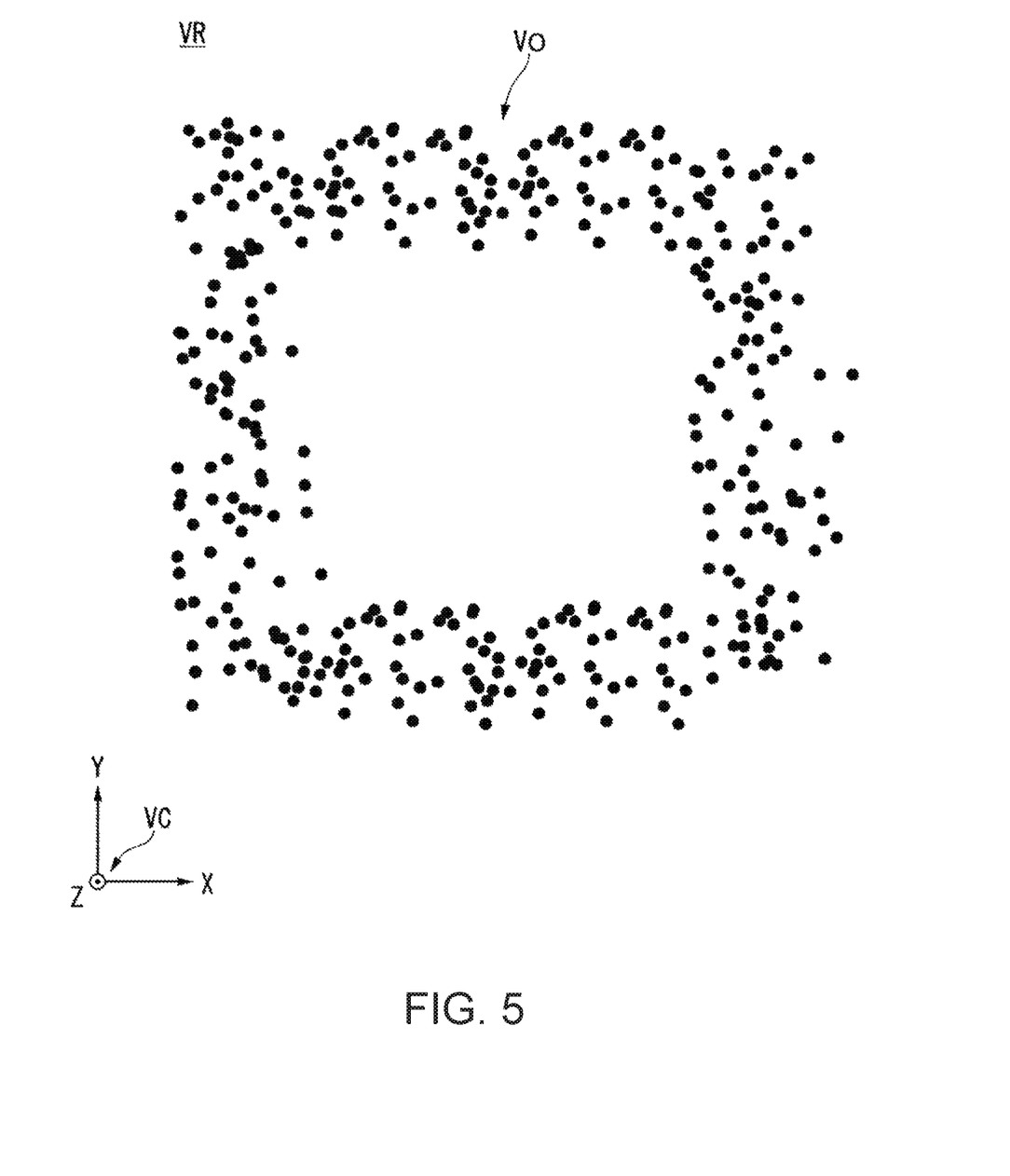
FIG. 5 shows an example of a whole-circumference point cloud arranged within a virtual space VR.

Now, referring to FIG. 5, the whole-circumference point cloud arranged in the virtual space VR will be described. FIG. 5 shows an example of the whole-circumference point cloud arranged in the virtual space VR. A whole-circumference point cloud VO shown in FIG. 5 is an example of the whole-circumference point cloud arranged in the virtual space VR. The position of each point forming the whole-circumference point cloud VO arranged in the virtual space VR is expressed by coordinates on a virtual space coordinate system VC shown in FIG. 5. In FIG. 5, in order to simplify the illustration, a partial point cloud representing the shape of the top surface of the target object O, of the whole-circumference point cloud, is omitted.

Next, the evaluation value calculation unit 46 reads out, from the storage unit 32, gripping unit information stored in advance in the storage unit 32. The gripping unit information is information indicating the shape and size or the like of the gripping unit H. The evaluation value calculation unit 46 generates a virtual gripping unit VH which is a virtual version of the gripping unit H, based on the gripping unit information thus read out. The evaluation value calculation unit 46 arranges the generated virtual gripping unit VH at a predetermined position in the virtual space VR (Step S145). At this point, the evaluation value calculation unit 46 causes the attitude of the virtual gripping unit VH to coincide with a predetermined attitude. The predetermined position and the predetermined attitude in the virtual space VR may be any position and attitude in the virtual space VR.

Next, the evaluation value calculation unit 46 specifies a virtual gripping position which is one or more positions to be a target with which the position of the virtual gripping unit VH is made to coincide in the virtual space VR (Step S147). The processing of Step S147 will now be described. A virtual gripping unit coordinate system HC which is a three-dimensional local coordinate system moving with the virtual gripping unit VH is made to correspond to a predetermined position on the virtual gripping unit VH. Therefore, the position of the virtual gripping unit VH is expressed by the position of the origin of the virtual gripping unit coordinate system HC on the virtual space coordinate system VC. The virtual gripping unit coordinate system HC is a three-dimensional coordinate system corresponding to the gripping unit coordinate system. Therefore, the predetermined position on the virtual gripping unit VH is the position corresponding to the position of the center of gravity of the gripping unit H, and in this example, the position of the center of gravity of the virtual gripping unit VH.

The evaluation value calculation unit 46 specifies a gripping unit arrangement available area which is an area that satisfies a predetermined area condition, described below, in the virtual space VR, based on the position of each of a virtual finger VH1 and a virtual finger VH2 of the virtual gripping unit VH, and the whole-circumference point cloud. The virtual finger VH1 is a virtual version of the finger H1 corresponding to the finger H1 of the gripping unit H. The virtual finger VH2 is a virtual version of the finger H2 corresponding to the finger H2 of the gripping unit H.

The area condition refers to an area where the virtual gripping unit VH can virtually pinch and grab (pinch and grip) the whole-circumference point cloud by reducing the distance between the virtual finger VH1 and the virtual finger VH2 in the case where the virtual gripping unit VH is arranged.

The evaluation value calculation unit 46 divides the gripping unit arrangement available area specified based on the area condition into a plurality of sub-areas based on a predetermined division condition, described below.

The division condition is that the respective sub-areas have the same size and shape.

In the description below, as an example, the case where each sub-area has a cubic shape will be described. Also, instead of this, the division condition may be other conditions, such as that a part or all of the plurality of sub-areas are in different shapes and sizes from each other.

The evaluation value calculation unit 46 specifies respective points of intersection between straight lines virtually dividing the area into the sub-areas, as a plurality of virtual gripping positions. The evaluation value calculation unit 46 may also be configured to specify a virtual gripping position by other methods. For example, the evaluation value calculation unit 46 may be configured to specify, based on an operation accepted from the user, one or more positions in the virtual space VR that are designated by that operation, as virtual gripping positions.

Next, the evaluation value calculation unit 46 repeatedly carries out the processing of Steps S155 to S240 for each of the one or more virtual gripping positions specified in Step S147 (Step S150).

The evaluation value calculation unit 46 reads out, from the storage unit 32, virtual gripping attitude information stored in advance in the storage unit 32. The virtual gripping attitude information is information indicating each of one or more virtual gripping attitudes. The virtual gripping attitudes are one or more attitudes selected by the user from among attitude that can be taken by the virtual gripping unit VH at the respective virtual gripping positions. Each virtual gripping attitude is expressed by the direction of each coordinate axis of the virtual gripping unit coordinate system HC on the virtual space coordinate system VC. The direction is expressed by U-axis, V-axis and W-axis coordinates on the virtual space coordinate system. The U-axis is a coordinate axis representing the angle of rotation in the case where the virtual gripping unit coordinate system HC is rotated around the X-axis of the virtual space coordinate system VC. The V-axis is a coordinate axis representing the angle of rotation in the case where the virtual gripping unit coordinate system HC is rotated around the Y-axis of the virtual space coordinate system VC. The W-axis is a coordinate axis representing the angle of rotation in the case where the virtual gripping unit coordinate system HC is rotated around the Z-axis of the virtual space coordinate system VC. The evaluation value calculation unit 46 repeatedly carries out the processing of Steps S160 to S240 for each of the one or more virtual gripping attitudes indicated by the virtual gripping attitude information read out from the storage unit 32 (Step S155).

Next, the evaluation value calculation unit 46 moves the virtual gripping unit VH in the virtual space VR and thus causes the position of the virtual gripping unit VH to coincide with the virtual gripping position selected in Step S150 and also causes the attitude of the virtual gripping unit VH to coincide with the virtual gripping attitude selected in Step S155 (Step S160). Now, the processing of Step S160 will be described, referring to FIG. 6.

Figure 6:
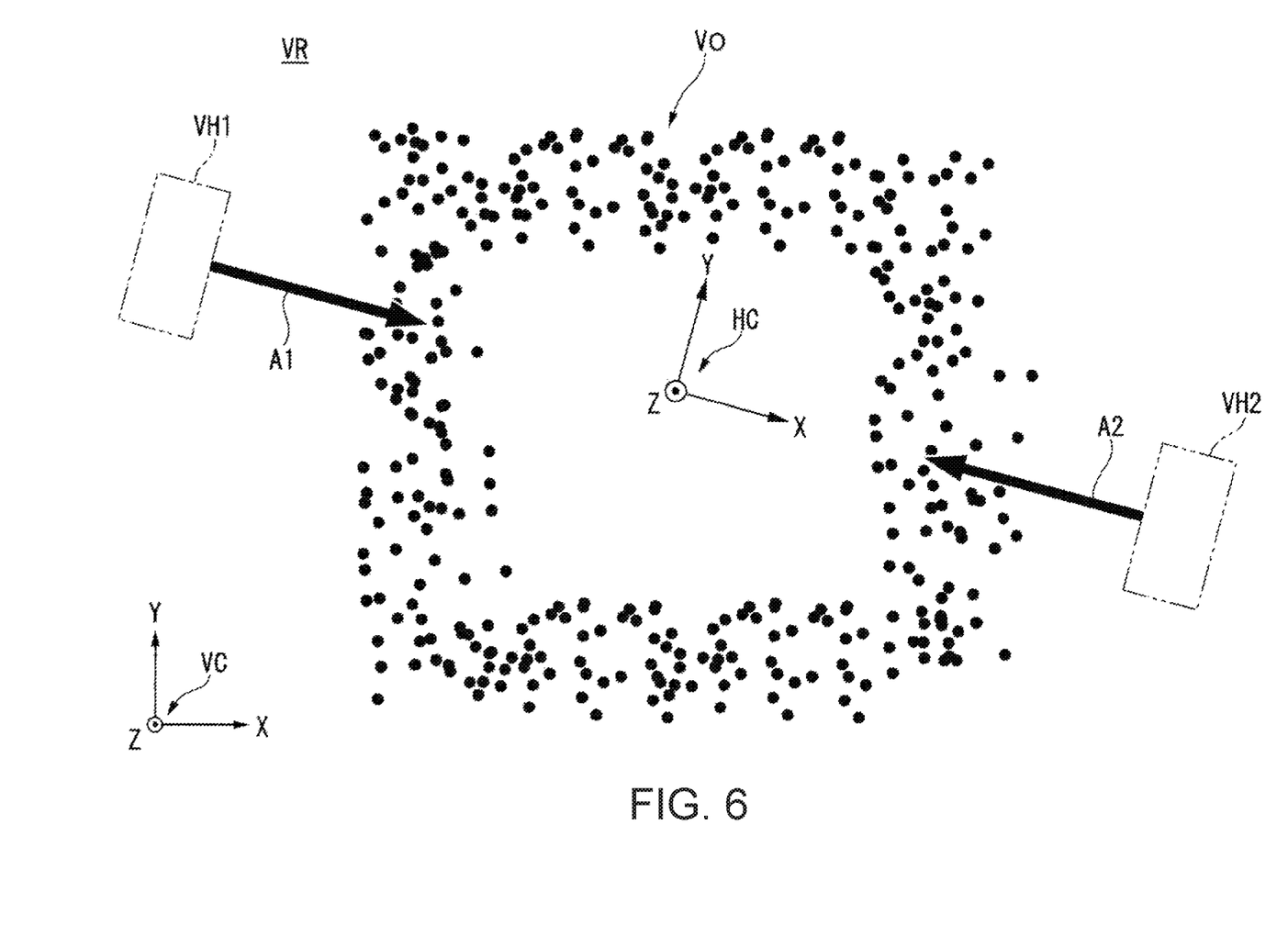
FIG. 6 shows an example of the state where the position of a virtual gripping unit VH coincides with a virtual gripping position selected in Step S150, in the virtual space shown in FIG. 5.

FIG. 6 shows an example of the state where the position of the virtual gripping unit VH coincides with the virtual gripping position selected in Step S150, in the virtual space VR shown in FIG. 5. The position of the origin of the virtual gripping unit coordinate system HC on the virtual space coordinate system VC shown in FIG. 6 is an example of the virtual gripping position selected in Step S150. The two rectangles indicated by chain double double-dashed lines in FIG. 6 represent the virtual finger VH1 and the virtual finger VH2, respectively. As described above, in the case where the position of the virtual gripping unit VH is coincident with the virtual gripping position, the virtual gripping unit VH can grab (grip) the whole-circumference point cloud by reducing the distance between the virtual finger VH1 and the virtual finger VH2. In the example shown in FIG. 6, as the virtual finger VH1 is moved in the direction indicated by an arrow A1 and the virtual finger VH2 is moved in the direction indicated by an arrow A2, both of the virtual finger VH1 and the virtual finger VH2 come in contact with a part of the whole-circumference point cloud. That is, in the case where the position of the virtual gripping unit VH is made coincident with the virtual gripping position shown in FIG. 6, the virtual gripping unit VH can grab and grip the whole-circumference point cloud by reducing the distance between the virtual finger VH1 and the virtual finger VH2. As described above, the whole-circumference point cloud is a three-dimensional point cloud representing the shape of the entire surface visible from outside, of the target object O placed on the top surface of the workbench TB. That is, that the virtual gripping unit VH can grab and grip the whole-circumference point cloud means that the virtual gripping unit VH can grab and grip the virtual version of the target object O in the virtual space VR. Here, the direction indicated by the arrow A1 is opposite to the direction indicated by the arrow A2 and is the direction in which the virtual finger VH1 approaches the virtual finger VH2. Meanwhile, the direction indicated by the arrow A2 is opposite to the direction indicated by the arrow A1 and is the direction in which the virtual finger VH2 approaches the virtual finger VH1. The direction of each coordinate axis of the virtual gripping unit coordinate system HC on the virtual space coordinate system VC shown in FIG. 6 represents an example of the virtual gripping attitude selected in Step S155.

After the processing of Step S160 is carried out, the evaluation value calculation unit 46 repeatedly carries out the processing of Steps S180 to S230 for each of one or more predetermined inter-finger distances (Step S170). Here, the inter-finger distance is one or more predetermined distances to be a target with which the distance between the virtual finger VH1 and the virtual finger VH2 is made to coincide.

The evaluation value calculation unit 46 moves the virtual finger VH1 in the direction indicated by the arrow A1 shown in FIG. 6 and moves the virtual finger VH2 in the direction indicated by the arrow A2 shown in FIG. 6, thus causing the distance between the virtual finger VH1 and the virtual finger VH2 to coincide with the inter-finger distance selected in Step S170 (Step S180).

Next, the evaluation value calculation unit 46 generates one or more virtual points representing the shape of the contour of a part that can come in contact with the whole-circumference point cloud, of the contour of the virtual finger VH1, as a first contact point candidate on the contour, and also generates one or more virtual points representing the shape of the contour of a part that can come in contact with the whole-circumference point cloud, of the contour of the virtual finger VH2, as a second contact point candidate on the contour (Step S190). Each of the first contact point candidate and the second contact point candidate is an example of one or more virtual points corresponding to the gripping unit.

Now, the processing of Steps S180 to S190 will be described, referring to FIG. 7.

Figure 7:
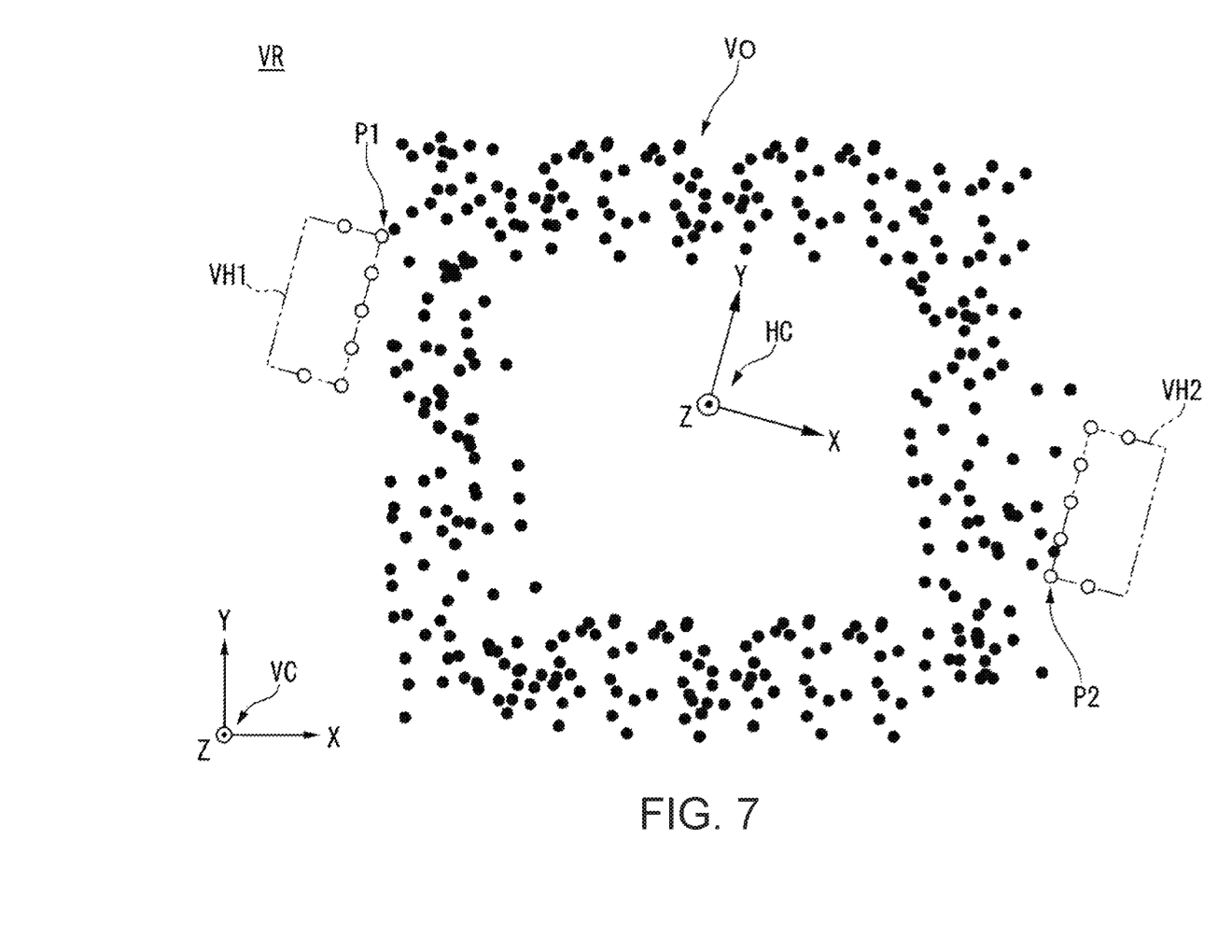
FIG. 7 shows an example of the state where the distance between a virtual finger VH1 and a virtual finger VH2 shown in FIG. 6 coincides with an inter-finger distance selected in Step S170.

FIG. 7 shows an example of the state where the distance between the virtual finger VH1 and the virtual finger VH2 shown in FIG. 6 coincides with the inter-finger distance selected in Step S170. The distance between the virtual finger VH1 and the virtual finger VH2 shown in FIG. 7 is an example of the inter-finger distance selected in Step S170.

After Step S180, where the distance between the virtual finger VH1 and the virtual finger VH1 is made to coincide with the inter-finger distance selected in Step S170, the evaluation value calculation unit 46 generates a first contact point candidate and a second contact point candidate, based on an operation accepted in advance from the user. Each of the seven first contact point candidates P1 shown in FIG. 7 is an example of the first contact point candidate generated by the evaluation value calculation unit 46. Also, each of the seven second contact point candidates P2 shown in FIG. 7 is an example of the second contact point candidate generated by the evaluation value calculation unit 46. The evaluation value calculation unit 46 may be configured to generate a first contact point candidate and a second contact point candidate, based on the gripping unit information stored in advance in the storage unit 32 and the shape of the whole-circumference point cloud, instead of the configuration to generate a first contact point candidate and a second contact point candidate, based on an operation accepted in advance from the user. For example, the evaluation value calculation unit 46 may be configured to generate a predetermined number of points representing the shape of the contour of the virtual finger VH1 as first contact point candidates and generate a predetermined number of points representing the shape of the contour of the virtual finger VH2 as second contact point candidates.

After the processing of Step S190 is carried out, the evaluation value calculation unit 46 repeatedly carries out the processing of Steps S195 to S230 for each of the virtual finger VH1 and the virtual finger VH2 (Step S193).

In the description below, the case where the virtual finger VH1 is selected in Step S193 will be described first. The evaluation value calculation unit 46 repeatedly carries out the processing of Steps S200 to S230 for each of the first contact point candidates generated in Step S190 (Step S195).

The evaluation value calculation unit 46 calculates a wrench of the first contact point candidate selected in Step S195 (Step S200). The wrench represents a force and moment that can act on the target object from the finger in the form of a vector. The processing of Step S200 in the case where the virtual finger VH1 is selected in Step S193 will now be described.

In the description below, the first contact point candidate which is a target to be processed by the evaluation value calculation unit 46 in the processing of Steps S200 to S230 in the case where the virtual finger VH1 is selected in Step S193 is referred to as a target first contact point candidate. As a method for calculating the wrench in Step S200, a known method or a method yet to be developed may be used. Therefore, only the main idea about such a method will be described.

The evaluation value calculation unit 46 calculates a normal vector based on a plurality of points forming the whole-circumference point cloud which are included in a first spherical area with a predetermined radius around the target first contact point candidate. Here, each first spherical area around each first contact point candidate is an example of one or more areas corresponding to the gripping unit of the robot. The plurality of points forming the whole-circumference point cloud which are included in each first spherical area is an example of a partial point cloud included in one or more areas corresponding to the gripping unit of the robot. The evaluation value calculation unit 46 calculates a cone of friction of the target first contact point candidate with the calculated normal vector serving as a center axis (direction of cone of friction), and approximates the calculated cone of friction as a polyhedron. Here, a force applied to the target object O by the finger H1 and a coefficient of friction related to a frictional force generated between the finger H1 and the target object O are inputted to the robot control device 30 in advance by the user. The evaluation value calculation unit 46 calculates a wrench with respect to the direction of each ridgeline of the polyhedron approximating the cone of friction (each slant edge from the apex of the cone of friction toward the base of the cone of friction). Here, the wrench is a vector made up of a force applied to the target object O by the finger H1 at the target first contact point candidate and a moment generated on the target object O by this force. The moment may be multiplied by a coefficient for scale conversion.

After the processing of Step S200 in the case where the virtual finger VH1 is selected in Step S193 is carried out, the evaluation value calculation unit 46 calculates the density of the plurality of points forming the whole-circumference point cloud which are included in the first spherical area (Step S210). The processing of Step S210 in the case where the virtual finger VH1 is selected in Step S193 will now be described.

Based on the whole-circumference point cloud and an area of the same shape and size as the first spherical area, the evaluation value calculation unit 46 calculates an arrangement position of the area on the whole-circumference point cloud such that the number of points forming the whole-circumference point cloud which are included in the area is at its maximum in the case where the area is arranged on the whole-circumference point cloud in such a way that the area includes a part of the whole-circumference point cloud. The evaluation value calculation unit 46 calculates the number of points forming the whole-circumference point cloud which are included in the area in the case where the area is arranged in the calculated arrangement position, as the maximum number of points.

The evaluation value calculation unit 46 calculates the number of points forming the whole-circumference point cloud which are included in the first spherical area, as the number of target points. The evaluation value calculation unit 46 then calculates the density of the plurality of points forming the whole-circumference point cloud which are included in the first spherical area, based on the calculated maximum number of points and the calculated number of target points. Specifically, the evaluation value calculation unit 46 calculates the density by dividing the number of target points divided by the maximum number of points.

After the processing of Step S210 in the case where the virtual finger VH1 is selected in Step S193 is carried out, the evaluation value calculation unit 46 calculates a value expressing the distribution of the plurality of points forming the whole-circumference point cloud which are included in the first spherical area (Step S220).

The evaluation value calculation unit 46 calculates a dispersion of the plurality of points forming the whole-circumference point cloud which are included in the first spherical area, in each of a first longitudinal direction which is the direction indicated by the arrow A1 and a first lateral direction orthogonal to the first longitudinal direction. The evaluation value calculation unit 46 calculates the value expressing the distribution of the points, by dividing the value of the dispersion of the points in the first lateral direction minus the dispersion of the points in the first longitudinal direction by the sum of the dispersion of the points in the first lateral direction and the dispersion of the points in the first longitudinal direction. Instead of this, the value expressing the distribution of the points may be other values based on these dispersions.

After the processing of Step S220 in the case where the virtual finger VH1 is selected in Step S193 is carried out, the evaluation value calculation unit 46 calculates the value of the wrench calculated in Step S200 in this case, multiplied by the density calculated in Step S210 in this case, multiplied by the value expressing the distribution calculated in Step S220 in this case, as a first evaluation value (Step S230). That is, the density and the value expressing the distribution are weights by which the wrench is multiplied. After the first evaluation value is calculated, the evaluation value calculation unit 46 shifts to Step S195 and selects a next target first contact point candidate. However, if there is no target first contact point candidate that is not selected in Step 195, the evaluation value calculation unit 46 shifts to Step S193 and selects the virtual finger VH2. The evaluation value calculation unit 46 may be configured to calculate the value of the wrench calculated in Step S200 in this case, multiplied by a weight based on the density calculated in Step S210 in this case and the value expressing the distribution calculated in Step S220 in this case, as the first evaluation value. In this case, for example, the evaluation value calculation unit 46 calculates the weight by multiplying the density and the value expressing the distribution by a certain coefficient, and calculates the first evaluation value by multiplying the wrench by the calculated weight.

Now, the case where the virtual finger VH2 is selected in Step S193 will be described. In Step S195, the evaluation value calculation unit 46 repeatedly carries out the processing of Steps S200 to S230 for each of the second contact point candidates generated in Step S190.

In Step S200, the evaluation value calculation unit 46 calculates a wrench of the second contact point candidate selected in Step S195. The processing of Step S200 in the case where the virtual finger VH2 is selected in Step S193 will now be described.

In the description below, the second contact point candidate which is a target to be processed by the evaluation value calculation unit 46 in the processing of Steps S200 to S230 in the case where the virtual finger VH2 is selected in Step S193 is referred to as a target second contact point candidate.

The evaluation value calculation unit 46 calculates a normal vector based on a plurality of points forming the whole-circumference point cloud which are included in a second spherical area with a predetermined radius around the target second contact point candidate. Here, each second spherical area around each second contact point candidate is an example of one or more areas corresponding to the gripping unit of the robot. The plurality of points forming the whole-circumference point cloud which are included in each second spherical area is an example of a partial point cloud included in one or more areas corresponding to the gripping unit of the robot. The evaluation value calculation unit 46 calculates a cone of friction of the target second contact point candidate with the calculated normal vector serving as a center axis (direction of cone of friction), and approximates the calculated cone of friction as a polyhedron. Here, a force applied to the target object O by the finger H2 and a coefficient of friction related to a frictional force generated between the finger H2 and the target object O are inputted to the robot control device 30 in advance by the user. The evaluation value calculation unit 46 calculates a wrench with respect to the direction of each ridgeline of the polyhedron approximating the cone of friction (each slant edge from the apex of the cone of friction toward the base of the cone of friction). Here, the wrench is a vector made up of a force applied to the target object O by the finger H2 at the target second contact point candidate and a moment generated on the target object O by this force. The moment may be multiplied by a coefficient for scale conversion.

After the processing of Step S200 in the case where the virtual finger VH2 is selected in Step S193 is carried out, the evaluation value calculation unit 46, in Step S210 in this case, calculates the density of the plurality of points forming the whole-circumference point cloud which are included in the second spherical area. The processing of Step S210 in this case will now be described.

The evaluation value calculation unit 46 calculates the number of points forming the whole-circumference point cloud which are included in the second spherical area, as the number of target points. The evaluation value calculation unit 46 then calculates the density of the plurality of points forming the whole-circumference point cloud which are included in the spherical area, based on the calculated maximum number of points and the calculated number of target points. Specifically, the evaluation value calculation unit 46 calculates the density by dividing the number of target points divided by the maximum number of points.

After the processing of Step S210 in the case where the virtual finger VH2 is selected in Step S193 is carried out, the evaluation value calculation unit 46, in Step S220 in this case, calculates a value expressing the distribution of the plurality of points forming the whole-circumference point cloud which are included in the second spherical area.

The evaluation value calculation unit 46 calculates a dispersion of the plurality of points forming the whole-circumference point cloud which are included in the second spherical area, in each of a second longitudinal direction which is the direction indicated by the arrow A2 and a second lateral direction orthogonal to the second longitudinal direction. The evaluation value calculation unit 46 calculates the value expressing the distribution of the points, by dividing the value of the dispersion of the points in the second lateral direction minus the dispersion of the points in the second longitudinal direction by the sum of the dispersion of the points in the second lateral direction and the dispersion of the points in the second longitudinal direction. Instead of this, the value expressing the distribution of the points may be other values based on these dispersions.

After the processing of Step S220 in the case where the virtual finger VH2 is selected in Step S193 is carried out, the evaluation value calculation unit 46, in Step S230 in this case, calculates the value of the wrench calculated in Step S200 in this case, multiplied by the density calculated in Step S210 in this case, multiplied by the value expressing the distribution calculated in Step S220 in this case, as a first evaluation value. After the first evaluation value is calculated, the evaluation value calculation unit 46 shifts to Step S195 and selects a next target second contact point candidate. However, if there is no target second contact point candidate that is not selected in Step 195, the evaluation value calculation unit 46 shifts to Step S170 and selects a next inter-finger distance. The evaluation value calculation unit 46, in Step S230 in this case, may be configured to calculate the value of the wrench calculated in Step S200 in this case, multiplied by a weight based on the density calculated in Step S210 in this case and the value expressing the distribution calculated in Step S220 in this case, as the first evaluation value. In this case, for example, the evaluation value calculation unit 46 calculates the weight by multiplying the density and the value expressing the distribution by a certain coefficient, and calculates the first evaluation value by multiplying the wrench by the calculated weight.

After the repetitive processing of Steps S170 to S240 is carried out, the evaluation value calculation unit 46 calculates, as the foregoing evaluation value, a second evaluation value which is the total sum of the first evaluation values calculated each time Step S230 is executed, divided by the number of the first evaluation values (Step S240). The evaluation value is a value expressing the degree of stability of the gripping of the target object O by the gripping unit H in the case where the position and the attitude of the gripping unit H coincide with the virtual gripping position selected in Step S150 and the virtual gripping attitude selected in Step S155. After the second evaluation value is calculated, the evaluation value calculation unit 46 shifts to Step S155 and selects a next virtual gripping attitude. However, if there is no virtual gripping attitude that is not selected in Step S155, the evaluation value calculation unit 46 shifts to Step S150 and selects a next virtual gripping position.

After the repetitive processing of Steps S150 to S240 is carried out, the gripping position and attitude calculation unit 48 calculates (specifies), as the foregoing gripping position and attitude, the virtual gripping position selected in Step S150 in the case where the maximum evaluation value is calculated, from among the plurality of evaluation values (that is, second evaluation values) calculated in Step S240, and the virtual gripping attitude selected in Step S155 in this case (Step 250).

Next, the robot control unit 50 causes the arm A to move based on the gripping position and attitude calculated (specified) in Step S250 and causes the position of the gripping unit H to coincide with the gripping position and attitude. The robot control unit 50 reduces the distance between the finger H1 and the finger H2 of the gripping unit H and causes the gripping unit H to grip the target object O. The robot control unit 50 causes the robot 20 to move and place the target object O gripped by the gripping unit H to a material feeding area, not illustrated. The processing then ends.

Figure 8:
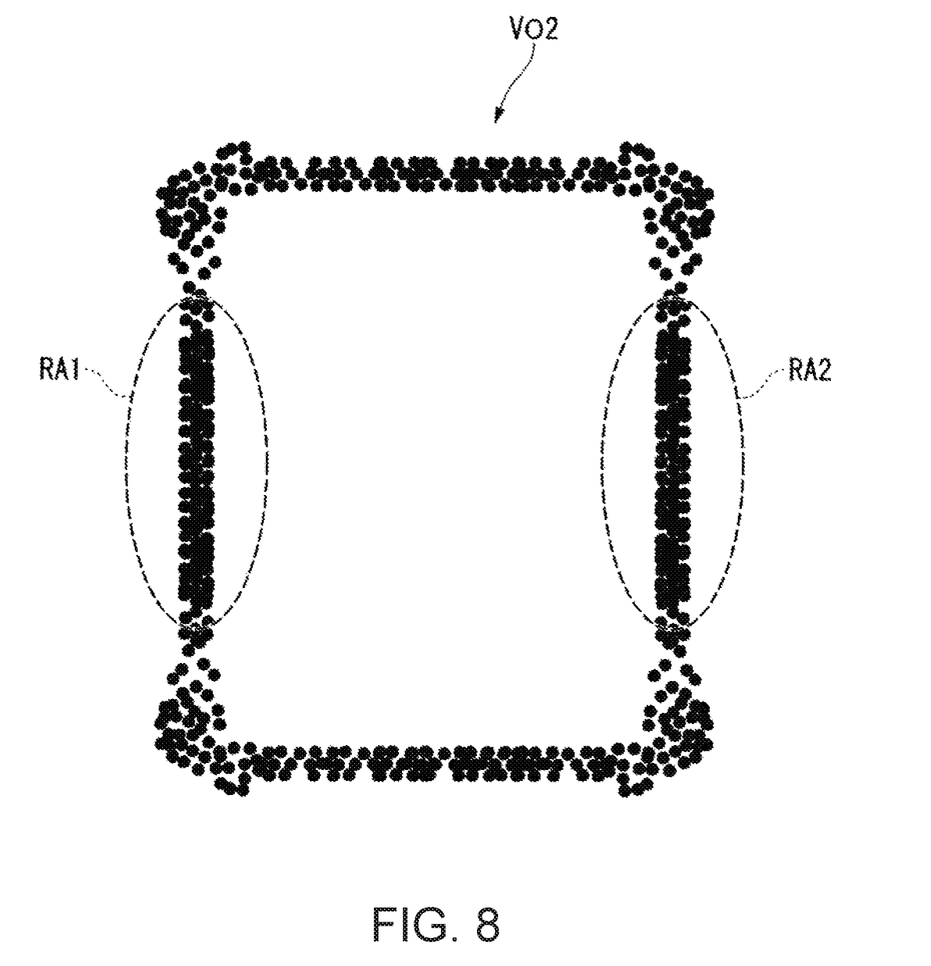
FIG. 8 shows an example of a site on a target object O in the case where the position and the attitude of a gripping unit H coincide with a gripping position and attitude calculated in Step S250 and where each of a finger H1 and a finger H2 comes in contact with the target object O.

Now, the gripping position and attitude calculated in Step S250 will be described, referring to FIG. 8. FIG. 8 shows an example of sites on the target object O where the finger H1 and the finger H2 come in contact with the target object O in the case where the position and the attitude of the gripping unit H coincide with the gripping position and attitude calculated in Step S250. In FIG. 8, in order to clearly show the density and distribution of the plurality of points forming the whole-circumference point cloud, a whole-circumference point cloud VO2 as an example of a different whole-circumference point cloud from the whole-circumference point cloud shown in FIGS. 5 to 7 is shown. In FIG. 8, in order to simplify the illustration, a partial point cloud representing the shape of the top surface of an object having the shape represented by the whole-circumference point cloud VO2, of partial point clouds forming the whole-circumference point cloud VO2, is omitted. In the description below, this object is referred to as a target object O2 for the sake of convenience of the description.

The evaluation value calculation unit 46 calculates a position and an attitude such that each of the finger H1 and the finger H2 can grab (grip) a site with a high density and a thin thickness, of various sites of the whole-circumference point cloud VO2, as the gripping position and attitude in Step S250 by the processing of the flowchart shown in FIG. 4. In the example shown in FIG. 8, the evaluation value calculation unit 46 calculates a position and an attitude such that a site in an area surrounded by a dashed line RA1, of various sites of the whole-circumference point cloud VO2, and a site in an area surrounded by a dashed line RA2, of various sites of the whole-circumference point cloud VO2, can be grabbed (gripped), as the gripping position and attitude in Step S250.

The reason why the gripping position and attitude calculated in Step S250 have such features is that the weight by which the wrench is multiplied when calculating the first evaluation value is a value based on the density and the value expressing the distribution of the plurality of points included in the first spherical area or the second spherical area. A site where the density is high and where the value expressing the distribution is small, of various sites of the whole-circumference point cloud VO2, is a site where the shape of the surface of the target object O2 that is visible from outside is accurately represented. Therefore, the robot control device 30 can calculate a gripping position and attitude with these features in Step S250 and therefore can cause the robot 20 to grip the target object stably.

The robot control device 30 may be configured to select only one of the virtual finger VH1 and the virtual finger VH2 in Step S193 shown in FIG. 4.

The robot control device 30 may be configured to calculate a value based on the sum of the first evaluation values calculated for the virtual finger VH1 and the sum of the first evaluation values calculated for the virtual finger VH2, such as the average of these values, as the second evaluation value in Step S240 shown in FIG. 4.

As described above, the robot control device 30 calculates an evaluation value (in this example, the second evaluation value), based on a partial point cloud included in one or more areas (in this example, the first spherical area or the second spherical area) corresponding to a gripping unit (in this example, the gripping unit H) of a robot (in this example, the robot 20) for gripping a target object (in this example, the target object O), of a three-dimensional point cloud (in this example, the whole-circumference point cloud VO) representing a three-dimensional shape of a surface of the target object. The robot control device 30 calculates a position and an attitude (in this example, the gripping position and attitude) of the gripping unit taken when the gripping unit is made to grip the target object, based on the calculated evaluation value. The robot control device 30 causes the gripping unit to grip the target object, based on the position and the attitude of the gripping unit thus calculated. Thus, the robot control device 30 can cause the robot to grip the target object stably.

Also, in the robot control device 30, the one or more areas corresponding to the gripping unit of the robot for gripping the target object, of the three-dimensional point cloud representing the three-dimensional shape of the surface of the target object, are areas based on each of one or more virtual points (in this example, the first contact point candidate or the second contact point candidate) corresponding to the gripping unit. Thus, the robot control device 30 can cause the robot to grip the target object stably, based on the area based on each of the one or more virtual points corresponding to the gripping unit.

The robot control device 30 calculates the evaluation value, based on at least one of a density of the partial point cloud and a value expressing distribution of points forming the partial point cloud, and calculates the position and the attitude of the gripping unit taken when the gripping unit is made to grip the target object, based on the calculated evaluation value. Thus, the robot control device 30 can cause the robot to grip the target object stably, based on the evaluation value calculated on the basis of at least one of the density of the partial point cloud and the value expressing the distribution of the points forming the partial point cloud.

The robot control device 30 calculates each of a first evaluation value expressing stability of gripping the target object by the gripping unit, the density of the partial point cloud, and the value expressing the distribution of the points forming the partial point cloud, based on the partial point cloud. The robot control device 30 calculates, as the evaluation value, a second evaluation value by multiplying the calculated first evaluation value by a weight based on the density and the value. The robot control device 30 calculates the position and the attitude of the gripping unit taken when the gripping unit is made to grip the target object, based on the calculated evaluation value. Thus, the robot control device 30 can cause the robot to grip the target object stably, based on the second evaluation value calculated by multiplying the first evaluation value by the weight based on the density of the partial point cloud and the value expressing the distribution of the points forming the partial point cloud.

The embodiment of the invention has been described in detail with reference to the drawings. However, the specific configurations are not limited to those described in the embodiment and may be changed, replaced, or deleted without departing from the scope of the invention.

Also, a program for realizing the functions of an arbitrary component of the device described above (for example, the robot control device 30) may be recorded in a computer-readable recording medium, and a computer system may read and execute the program. The "computer system" in this case includes an OS (operating system) and hardware such as peripheral devices. The "computer-readable recording medium" refers to a portable medium such as a flexible disk, magneto-optical disk, ROM, or CD (compact disk)-ROM, or a storage device such as a hard disk built in the computer system. The "computer-readable recording medium" also includes a recording medium holding a program for a predetermined period of time, such as a volatile memory (RAM) inside a computer system to serve as a server or client when a program is transmitted via a network such as the internet or via a communication channel such as a telephone line.

The program may be transmitted from a computer system where this program is stored in a storage device or the like to another computer system via a transmission medium or via transmission waves in a transmission medium. Here, the "transmission medium" for transmitting the program refers to a medium having the function of transmitting information, such as a network (communication network) such as the internet, or a communication channel (communication line) such as a telephone line.

The program may also be a program for realizing a part of the foregoing functions. The program may also be a so-called differential file (differential program) capable of realizing the foregoing functions in combination with a program already recorded in the computer system.

The entire disclosure of Japanese Patent Application No. 2016-191980, filed Sep. 29, 2016 is expressly incorporated by reference herein.

What is claimed is:

1. A robot control device which controls an end effector of a robot, the robot control device comprising:
   a processor; and
   a memory;
   wherein the processor
   causes a stereo camera to pick up an image of a target object,
   acquires the image from the stereo camera, generates a three-dimensional point cloud representing a three-dimensional shape of a surface of the target object, calculates an evaluation value, based on a partial point cloud included in a plurality of areas corresponding to an end effector gripping the target object, of the three-dimensional point cloud, calculates a position and an attitude in which the end effector is made to grip the target object, based on the evaluation value, and controls the end effector, based on the position and the attitude, and the memory stores
 a computer-readable command, and
 the plurality of areas corresponding to the end effector.

2. The robot control device according to claim 1, wherein the areas are areas based respectively on a plurality of virtual points corresponding to the end effector.

3. The robot control device according to claim 2, wherein the evaluation value is calculated, based on
 a density of the partial point cloud included in the areas, and
 a value expressing distribution of points forming the partial point cloud.

4. The robot control device according to claim 3, wherein the position and the attitude of the end effector is calculated in such a way that stability calculated based on the evaluation value is at its maximum.

5. A robot comprising:
the robot control device according to claim 1; and
the end effector capable of gripping an object.

6. A robot system comprising:
the robot control device according to claim 1;
a robot; and
the stereo camera.

* * * * *